(12) United States Patent
Jeong et al.

(10) Patent No.: US 8,378,944 B2
(45) Date of Patent: Feb. 19, 2013

(54) ARRAY SUBSTRATE FOR IN-PLANE SWITCHING MODE LIQUID CRYSTAL DISPLAY DEVICE

(75) Inventors: Young-Min Jeong, Gyeonggi-do (KR); Su-Woong Lee, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 745 days.

(21) Appl. No.: 12/314,444

(22) Filed: Dec. 10, 2008

(65) Prior Publication Data
US 2009/0309822 A1 Dec. 17, 2009

(30) Foreign Application Priority Data
Jun. 13, 2008 (KR) ........................ 10-2008-0055903

(51) Int. Cl.
*G09G 3/36* (2006.01)
(52) U.S. Cl. ............................. 345/92; 345/87; 349/141
(58) Field of Classification Search .............. 345/87–92; 349/138–143, 147, 41–43
See application file for complete search history.

(56) References Cited

U.S. PATENT DOCUMENTS

| | | | | |
|---|---|---|---|---|
| 7,180,490 | B2 * | 2/2007 | Aoyama et al. | 345/87 |
| 7,551,257 | B2 * | 6/2009 | Lee et al. | 349/141 |
| 2004/0263744 | A1 * | 12/2004 | Lee et al. | 349/139 |
| 2004/0263750 | A1 * | 12/2004 | Chae | 349/141 |
| 2005/0046763 | A1 * | 3/2005 | Ono et al. | 349/39 |
| 2006/0146248 | A1 * | 7/2006 | Park | 349/141 |

* cited by examiner

*Primary Examiner* — Hong Zhou
(74) *Attorney, Agent, or Firm* — Morgan, Lewis & Bockius LLP

(57) ABSTRACT

An array substrate for an in-plane switching mode liquid crystal display device includes a first TFT in a pixel region and connected to a gate line and a first data line; a second TFT in the pixel region and connected to the gate line and a second data line; a first pattern connected to the first TFT and extending along the gate line; a plurality of first electrodes connected to the first pattern; a second pattern extending to be parallel to the first pattern; a second electrode extending along the first data line; a third electrode connected to the second pattern and extending along the second data line, the third electrode connected to the second TFT; and a plurality of fourth electrodes connected to the second pattern and alternately arranged with the plurality of first electrodes, wherein the plurality of first electrodes and the plurality of fourth electrodes are disposed between the second and third electrodes.

11 Claims, 8 Drawing Sheets

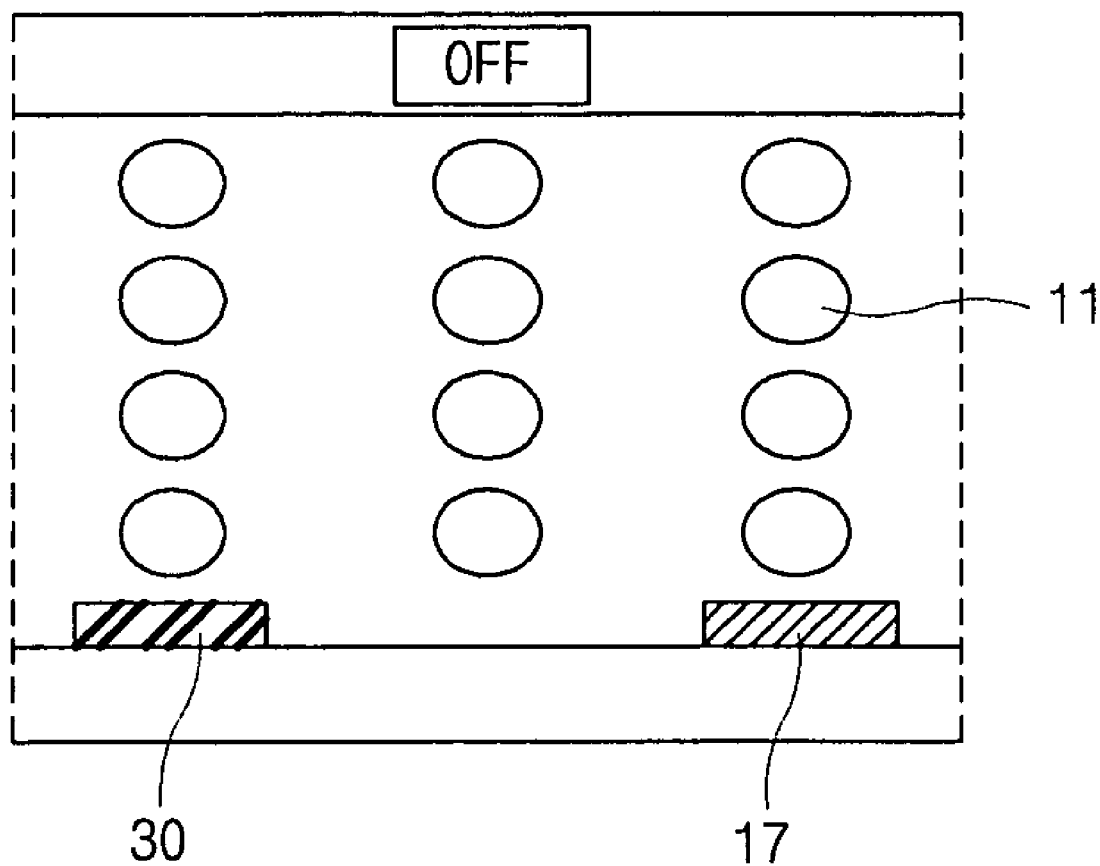

US 8,378,944 B2

ARRAY SUBSTRATE FOR IN-PLANE SWITCHING MODE LIQUID CRYSTAL DISPLAY DEVICE

The present application claims the benefit of Korean Patent Application No. 10-2008-0055903, filed in Korea on Jun. 13, 2008, which is hereby incorporated by reference in its entirety.

BACKGROUND OF THE INVENTION

1. Field of the Invention

The present invention relates to an array substrate for an in-plane switching (IPS) mode liquid crystal display (LCD) device and more particularly to an array substrate for an IPS mode LCD device having an improved aperture ratio.

2. Discussion of the Related Art

A related art liquid crystal display (LCD) device uses optical anisotropy and polarization properties of liquid crystal molecules. The liquid crystal molecules have a definite alignment direction as a result of their thin and long shapes. The alignment direction of the liquid crystal molecules can be controlled by applying an electric field across the liquid crystal molecules. In other words, as the intensity or direction of the electric field is changed, the alignment of the liquid crystal molecules also changes. Since incident light is refracted based on the orientation of the liquid crystal molecules due to the optical anisotropy of the liquid crystal molecules, images can be displayed by controlling light transmissivity.

Since the LCD device including a thin film transistor (TFT) as a switching element, referred to as an active matrix LCD (AM-LCD) device, has excellent characteristics of high resolution and displaying moving images, the AM-LCD device has been widely used.

The AM-LCD device includes an array substrate, a color filter substrate and a liquid crystal layer interposed therebetween. The array substrate may include a pixel electrode and the TFT, and the color filter substrate may include a color filter layer and a common electrode. The AM-LCD device is driven by an electric field between the pixel electrode and the common electrode to have excellent properties of transmittance and aperture ratio. However, since the AM-LCD device uses a vertical electric field, the AM-LCD device has a bad viewing angle.

An in-plane switching (IPS) mode LCD device may be used to resolve the above-mentioned limitations. FIG. 1 is a cross-sectional view of the related art IPS mode LCD device. As shown in FIG. 1, the related art IPS mode LCD device includes the array substrate and the color filter substrate separated apart from and facing each other. The array substrate includes a first substrate 10, a common electrode 17 and a pixel electrode 30. Though not shown, the array substrate may include a TFT, a gate line, a data line, and so on. The color filter substrate includes a second substrate 9, a color filter layer (not shown), and so on. A liquid crystal layer 11 is interposed between the first substrate 10 and the second substrate 9. Since the common electrode 17 and the pixel electrode 30 are formed on the first substrate 10 on the same level, a horizontal electric field "L" is generated between the common and pixel electrodes 17 and 30.

FIGS. 2A and 2B are cross-sectional views showing turned on/off conditions of the related art IPS mode LCD device. As shown in FIG. 2A, when the voltage is applied to the IPS mode LCD device, liquid crystal molecules 11a above the common electrode 17 and the pixel electrode 30 are unchanged. But, liquid crystal molecules 11b between the common electrode 17 and the pixel electrode 30 are horizontally arranged due to the horizontal electric field "L". Since the liquid crystal molecules 11 are arranged by the horizontal electric field "L", the IPS mode LCD device has a characteristic of a wide viewing angle. For example, the IPS mode LCD device has a viewing angle of about 80 degrees to about 85 degrees without an image inversion or a color inversion.

FIG. 2B shows a condition when the voltage is not applied to the IPS mode LCD device. Because an electric field is not generated between the common and pixel electrodes 17 and 30, the arrangement of liquid crystal molecules 11 is not changed.

FIG. 3 is a plane view of a portion of an array substrate for the related art IPS mode LCD device. In FIG. 3, the array substrate 40 includes a gate line 43, a common line 47, a data line 60, a plurality of common electrodes 49a and 49b, a plurality of pixel electrodes 70 and a thin film transistor (TFT) Tr. The gate line 43 extends along a first direction, and the common line 47 is parallel to the gate line 43. The data line 60 extends along a second direction being different from the first direction to cross the gate line 43 and the common line 47. Particularly, a crossing of the gate and data lines 43 and 60 defines a pixel region P.

The TFT Tr is disposed at a crossing portion of the gate and data lines 43 and 60. The TFT Tr includes a gate electrode 45, a semiconductor layer 50, a source electrode 53 and a drain electrode 55. The source electrode 53 extends from the data line 60, and the gate electrode 45 extends from the gate line 43. The pixel electrodes 70 is connected to the drain electrode 55 through a drain contact hole 67 and disposed in the pixel region P. The common electrodes 49a and 49b are alternately arranged with the pixel electrodes 70 and extend from the common line 47.

The common electrodes include first common electrodes 49a and a second common electrode 49b. The second common electrode 49b is disposed between the first common electrodes 49a, and each of the first common electrodes 49a is disposed to be adjacent to the data line 60. In this case, the first common electrodes 49a is spaced apart from the data line 60 with a pre-determined distance. A common voltage is applied into the common electrodes 49a and 49b through the common line 47, which is across the pixel region P, and an additional compensation or tuning for a difference in a common voltage resulted from charging of a constant voltage is required. Accordingly, production costs increase and a fabricating process is complicated.

In addition, since the first common electrodes 49a is spaced apart from the data line 60 to prevent signal interference between the first common electrodes 49a and the data line 60, an aperture ratio of the IPS mode LCD device decreases.

SUMMARY OF THE INVENTION

Accordingly, the present invention is directed to an array substrate for an IPS mode LCD device that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, an array substrate for an in-plane switching mode liquid crystal display device includes a gate line on a substrate; a gate insulating layer on the gate line; first and second data lines on the gate insulating layer and crossing the gate line to define a pixel region; a first thin film transistor (TFT) in the pixel region and connected to the gate line and the first data line; a second TFT in the pixel region and connected to the gate line and the second data line; a passivation layer on the first and second data lines and the first and second TFTs; a first pattern connected to the first TFT and extending along the gate line; a plurality of first electrodes connected to the first pattern and spaced apart from each other, the plurality of first electrodes parallel to the first and second data lines; a second pattern extending to be parallel to the first pattern; a second electrode extending along the first data line and spaced apart from the first data line by a first distance; a third electrode connected to the second pattern and extending along the second data line, the third electrode connected to the second TFT and spaced apart from the second data line by a second distance; and a plurality of fourth electrodes connected to the second pattern and alternately arranged with the plurality of first electrodes, wherein the plurality of first electrodes and the plurality of fourth electrodes are disposed between the second and third electrodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIGS. 2A and 2B are cross-sectional views showing turned on/off conditions of the related art IPS mode LCD device;

DETAILED DESCRIPTION OF THE PREFERRED EMBODIMENTS

Reference will now be made in detail to the preferred embodiments, examples of which are illustrated in the accompanying drawings.

Figure 4:
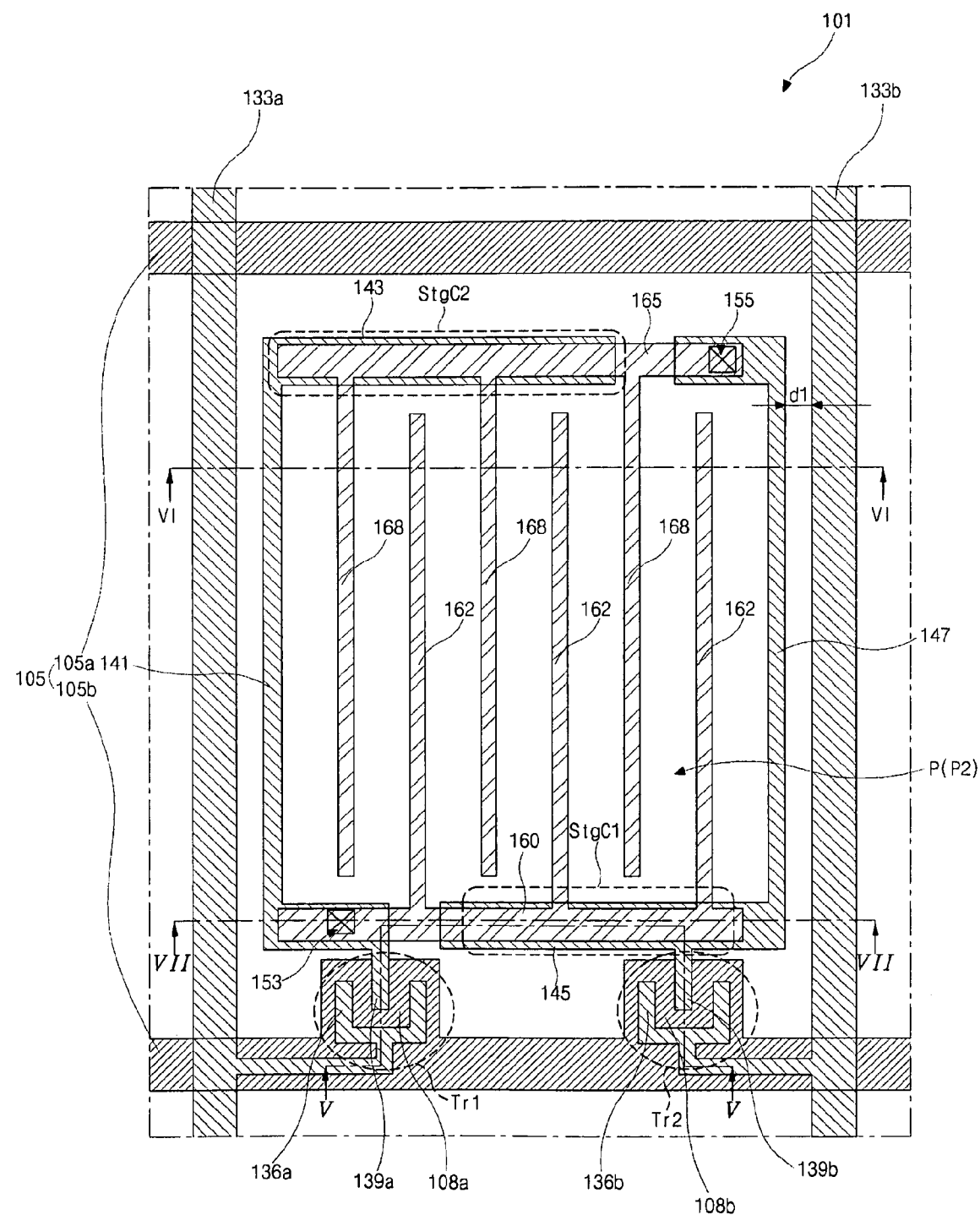
FIG. 4 is a schematic plane view showing one pixel region of an array substrate for an IPS mode LCD device according to a first embodiment of the present invention.

FIG. 4 is a schematic plane view showing one pixel region of an array substrate for an IPS mode LCD device according to a first embodiment of the present invention. In FIG. 4, the array substrate includes first and second gate lines 105a and 105b and first and second data lines 133a and 133b on a substrate 101. Each of the first and second data lines 133a and 133b crosses the first and second gate lines 105a and 105b to define pixel regions P.

First and second TFTs Tr1 and Tr2 are formed in each pixel region P. The first TFT Tr1 is disposed at a crossing portion of the second gate line 105b and the first data line 133a, while the second TFT Tr2 is disposed at a crossing portion of the second gate line 105b and the second data line 133b. The first TFT Tr1 is connected to the second gate line 105b and the first data line 133a, and the second TFT Tr2 is connected to the second gate line 105b and the second data line 133b. Although not shown, there are also two TFTs in an upper pixel region of the pixel region P in FIG. 4. One of the two TFTs in the upper pixel region is connected to the first gate line 105a and the first data line 133a, and the other of the two TFTs in the upper pixel region is connected to the first gate line 105a and the second data line 133b. Hereinafter, the first and second gate lines 105a and 105b are referred to a gate line 105.

The first TFT Tr1 includes a first gate electrode 108a, a gate insulating layer (not shown), a first semiconductor layer (not shown), which includes a first active layer (not shown) of intrinsic amorphous silicon and a first ohmic contact layer (not shown) of impurity-doped amorphous silicon, a first source electrode 136a and a first drain electrode 139a. The first semiconductor layer and the gate insulating layer are stacked on the first gate electrode 108a, and the first source electrode 136a and the first drain electrode 139a are formed on the first semiconductor layer. The first source electrode 136a is spaced apart from the first drain electrode 139a. The second TFT Tr2 includes a second gate electrode 108b, a gate insulating layer (not shown), a second semiconductor layer (not shown), which includes a second active layer (not shown) of intrinsic amorphous silicon and a second ohmic contact layer (not shown) of impurity-doped amorphous silicon, a second source electrode 136b and a second drain electrode 139b. The second semiconductor layer and the gate insulating layer are stacked on the second gate electrode 108b, and the second source electrode 136b and the second drain electrode 139b are formed on the second semiconductor layer. The second source electrode 136b is spaced apart from the second drain electrode 139b.

The first gate electrode 108a and the second gate electrode 108b are connected to the gate line 105, and the first source electrode 136a and the second source electrode 136b are connected to the first and second data lines 133a and 133b, respectively.

In the pixel region P, a first electrode 141 is formed along the first data line 133a to be adjacent to the first data line 133a. One end portion of the first electrode 141 is connected to the first drain electrode 139a of the first TFT Tr1, and the other end portion of the first electrode 141 is bent. The bent portion of the first electrode 141 is defined as a first bent portion 143. In the pixel region P, a second electrode 147 is formed along the second data line 133b to be adjacent to the second data line 133b. One end portion of the second electrode 147 is connected to the second drain electrode 139b of the second TFT Tr2, and the other end portion of the second electrode 147 is bent to face the other end portion of the first electrode 141. The one end portion of the second electrode 147 further extends along the gate line 105. The extending portion is defined as a second bent portion 145.

In addition, first and second patterns 160 and 165 is formed to be parallel to and spaced apart from the gate line 105. The first pattern 160 is located between the gate line 105 and the second pattern 165. The first pattern 160 is connected to the first electrode 141 through a first contact hole 153, and the second pattern 165 is connected to the second electrode 147 through a second contact hole 155. The first contact hole 153 corresponds to the one end portion of the first electrode 141, and the second contact hole 155 corresponds to the other one end portion of the second electrode 147. Since the first electrode 141 extends from the first drain electrode 139a, the first contact hole 153 may correspond to a portion of the first drain electrode 139a.

Furthermore, in the pixel region P, a plurality of third electrodes 162 extend from the first pattern 160 and are spaced apart from each other. A plurality of fourth electrodes 168 extend from the second pattern 165 and are spaced apart from each other. The third electrodes 162 and the fourth electrodes 168 are alternately arranged with each other and disposed between the first and second patterns 160 and 165 and the first and second electrodes 141 and 147.

The first pattern 160 overlaps the second bent portion 145 of the second electrode 147 such that an overlapped portion of the first pattern 160, overlaps the second bent portion 145 of the second electrode 147 and an insulating material layer (not shown) therebetween constitute a first storage capacitor StgC1. The second pattern 165 overlaps the first bent portion 143 of the first electrode 141 such that an overlapped portion of the second pattern 165, the first bent portion 143 of the first electrode 141 and an insulating material layer (not shown) therebetween constitute a second storage capacitor StgC2.

In the array substrate according to the present invention, a high signal voltage, which is greater than a reference voltage, is applied into the first data line 133a in a pulse profile, and a low signal voltage, which is smaller than a reference voltage, is applied into the second data line 133b in a pulse profile. Since the third electrodes 162 is electrically connected to the first data line 133a through the first pattern 160, the first contact hole 153, the first electrode 141 and the first TFT Tr1 and the fourth electrodes 168 is electrically connected to the second data line 133b through the second pattern 165, the second contact hole 155, the second electrode 147 and the first TFT Tr1, there is a voltage difference in the third and fourth electrodes 162 and 168 due to the high and low signal voltage in the pulse pattern. As a result, a horizontal electric field is induced between the third and fourth electrodes 162 and 168. Even if the first and second TFTs TFT1 and TFT2 have an off state, the voltage difference in the third and fourth electrodes 162 and 168 maintains due to the first and second storage capacitors StgC1 and StgC2.

Figure 1:
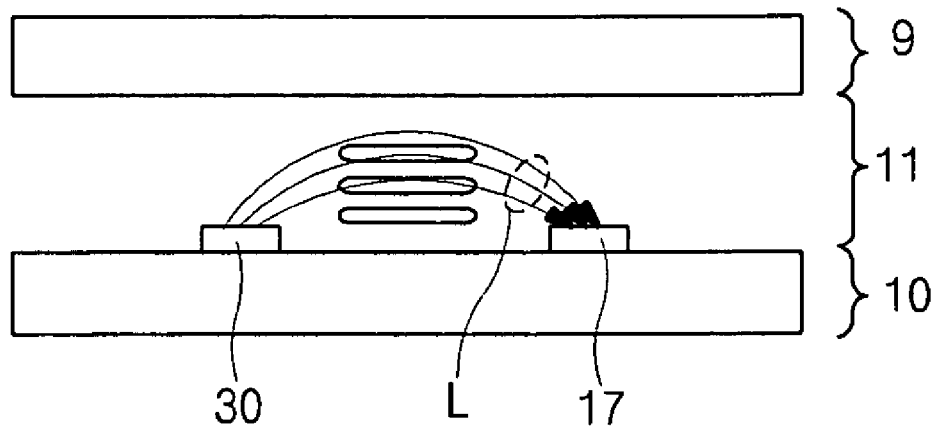
FIG. 1 is a cross-sectional view of the related art IPS mode LCD device.
Figure 2A:
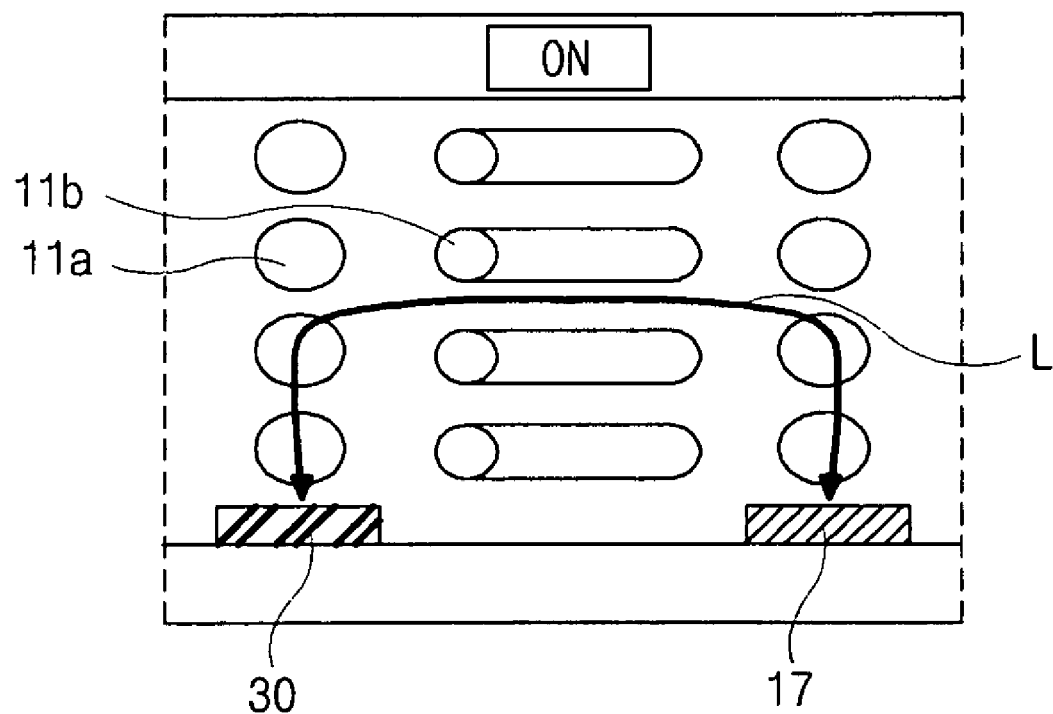
Figure 3:
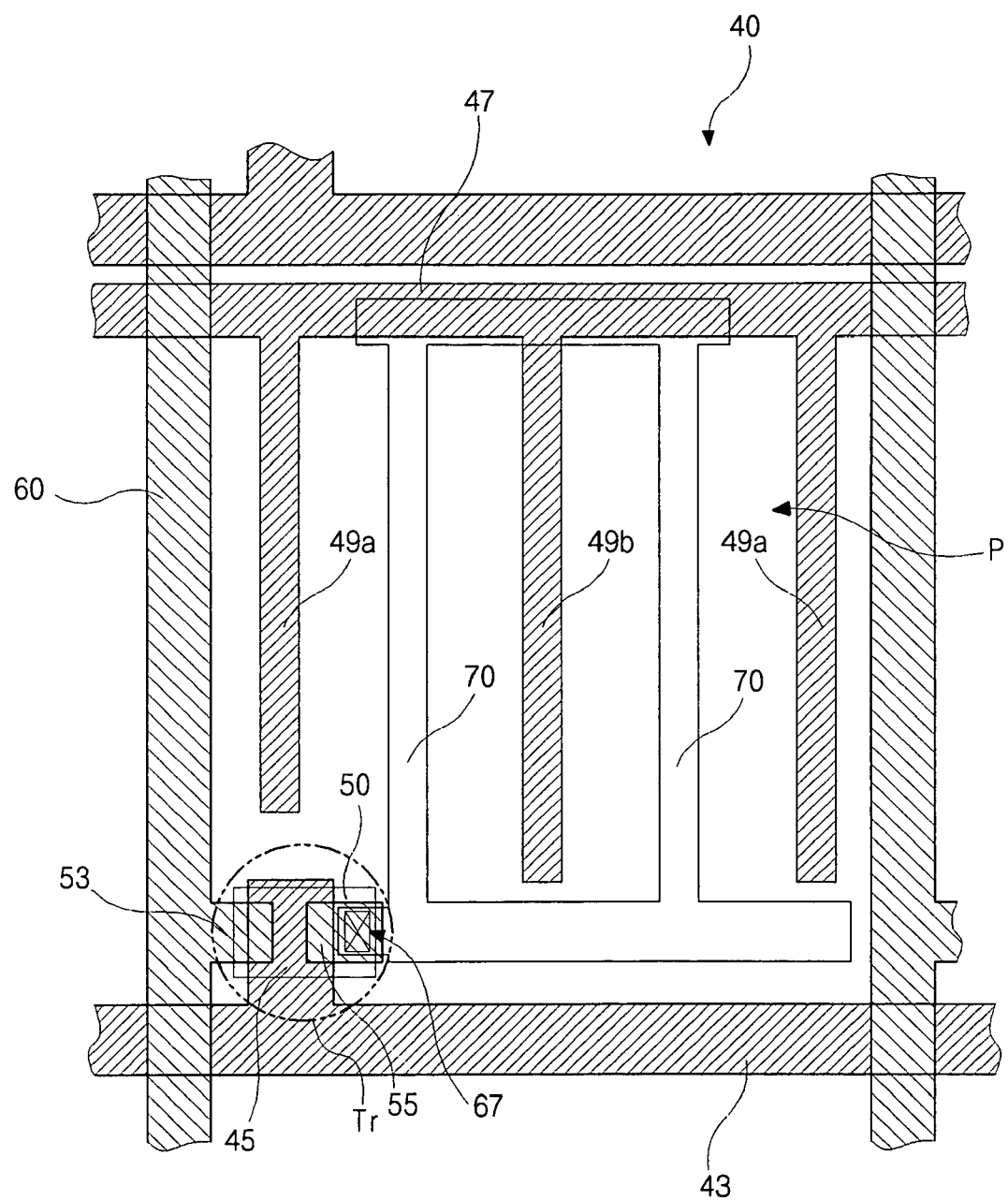
FIG. 3 is a plane view of a portion of an array substrate for the related art IPS mode LCD device.

Being compared with the related art array substrate in FIG. 3, there is no common electrode adjacent to the data line. Accordingly, an additional compensation or tuning for a difference in a common voltage resulted from charging of a constant voltage is not required. As a result, production costs can decrease and a fabricating process can be simplified. In addition, since the high and low signal voltages have a pulse pattern, problems, such as a flicker phenomenon, can be prevented such that the IPS mode LCD device has an improved image quality.

Figure 5:
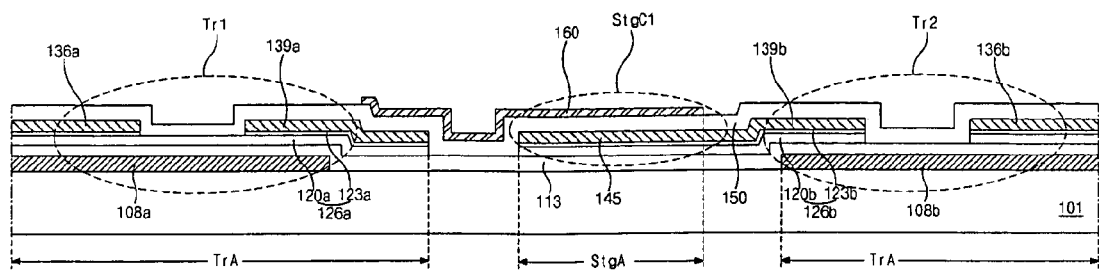
FIG. 5 is a cross-sectional view taken along the line V-V of FIG. 4.
Figure 6:
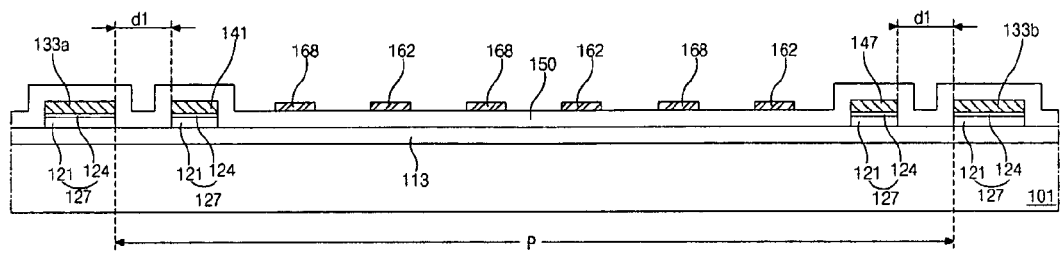
FIG. 6 is a cross-sectional view taken along the line VI-VI of FIG. 4.
Figure 7:
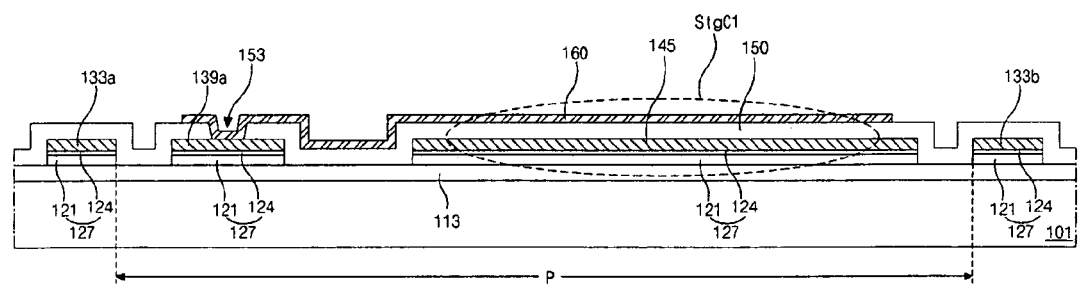
FIG. 7 is a cross-sectional view taken along the line VII-VII of FIG. 4.

With reference to FIGS. 5 to 7, a cross-sectional structure of the array substrate according to the first embodiment of the present invention in FIG. 4 is explained. FIG. 5 is a cross-sectional view taken along the line V-V of FIG. 4, FIG. 6 is a cross-sectional view taken along the line VI-VI of FIG. 4, and FIG. 7 is a cross-sectional view taken along the line VII-VII of FIG. 4. A switching region TrA, where the first and second TFTs are formed, and a storage region StgA, where the first storage capacitor is formed, are defined in the pixel region.

In FIGS. 5 to 7, the gate line 105 (of FIG. 4) of a first metallic material is formed on the substrate 101. The first and second gate electrodes 108a and 108b connected to the gate line are formed on the substrate 101 in the switching region TrA. The first and second gate electrodes 108a and 108b are formed of the same material as the gate line.

A gate insulating layer 113 of an inorganic insulating material is formed on the gate line and the first and second gate electrodes 108a and 108b. The first and second data lines 133a and 133b of a second metallic material are formed on the gate insulating layer 113. The first and second data lines 133a and 133b cross the gate line to define the pixel region P. In the switching region TrA, a first semiconductor layer 126a including a first active layer 120a and a first ohmic contact layer 123a and a second semiconductor layer 126b including a second active layer 120b and a second ohmic contact layer 123b are formed on the gate insulating layer 113. The first semiconductor layer 126a and the second semiconductor layer 126b correspond to the first and second gate electrodes 108a and 108b, respectively. The first source electrode 136a and the first drain electrode 139a, which are spaced apart from each other, are formed on the first semiconductor layer 126a, and the second source electrode 136b and the second drain electrode 139b, which are spaced apart from each other, are formed on the second semiconductor layer 126b. The first source electrode 136a is connected to the first data line 133a, and the second source electrode 136b is connected to the second data line 133b. Each of the first source electrode 136a, the first drain electrode 139a, the second source electrode 136b and the second drain electrode 139b may be formed of the same material as the first and second data lines 133a and 133b. The first gate electrode 108a, the gate insulating layer 113, the first semiconductor layer 126a, the first source electrode 136a and the first drain electrode 139a constitute the first TFT Tr1. The second gate electrode 108b, the gate insulating layer 113, the second semiconductor layer 126b, the second source electrode 136b and the second drain electrode 139b constitute the second TFT Tr2.

In addition, the first electrode 141, which is parallel and adjacent to the first data line 133a, is formed on the gate insulating layer 113. The first electrode 141 is connected to the first drain electrode 139a and formed of the same material as the first drain electrode 139a. Referring again to FIG. 4, one end of the first electrode 141 is connected to the first drain electrode 139a, and the first bent portion 143 (of FIG. 4) extends from the other end of the first electrode 141 into a region where the second storage capacitor StgC2 is formed. The first bent portion of the first electrode 141 is defined as a first capacitor electrode of the second storage capacitor StgC2 (of FIG. 4).

Referring to FIGS. 5 to 7, the second electrode 147, which is parallel and adjacent to the second data line 133b, is formed on the gate insulating layer 113. The second electrode 147 is connected to the second drain electrode 139b and formed of the same material as the second drain electrode 139b. One end of the second electrode 147 is connected to the second drain electrode 139b, and the second bent portion 145 extends from the one end of the second electrode 147 into the storage region StgA. The second bent portion 145 of the second electrode 147 is defined as a first capacitor electrode of the first storage capacitor StgC1.

A semiconductor pattern 127 having a double-layered structure of a first semiconductor pattern 124 and a second semiconductor pattern 121 is formed under each of the first and second data lines 133a and 133b, the first electrode 141 and the second electrode 147. The first and second semiconductor patterns 124 and 121 are formed of the same material as the ohmic contact layers 123a and 123b and the active layers 120a and 120b, respectively. Whether the semiconductor pattern 127 is disposed under each of the first and second data lines 133a and 133b, the first electrode 141 and the second electrode 147 depends on a fabricating method of the array substrate. The semiconductor pattern may be omitted by another fabricating process.

A passivation layer 150 is formed on the first and second data lines 133a and 133b, the first and second TFTs Tr1 and Tr2, and the first and second electrodes 141 and 147. The passivation layer 150 has the first and second contact holes 153 and 155 respectively exposing a portion of the first drain electrode 139a and a portion of the second electrode 147. The passivation layer 150 may be formed of one of an inorganic insulating material and an organic insulating material.

The first pattern 160 of a third metallic material is formed on the passivation layer 150. The first pattern 160 contacts the first drain electrode 139a through the first contact hole 153 and overlaps the second bent portion 145 of the second electrode 147. An overlapped portion of the first pattern 160 is defined as a second capacitor electrode of the first storage capacitor StgC1. The second bent portion 145 of the second electrode 147 as the first capacitor electrode, the overlapped portion of the first pattern 160 as the second capacitor electrode, and the passivation layer 150 as a dielectric material layer constitute the first storage capacitor StgC1. In addition, the plurality of third electrodes 162 extend from the first pattern 160 and are spaced apart from each other. The second pattern 165 is formed on the passivation layer 150. The second pattern 165 contacts the second electrode 147 through the second contact hole 155 and overlaps the first bent portion 143 (of FIG. 4) of the first electrode 141. The second pattern 165 is spaced apart from and parallel to the first pattern 160. An overlapped portion of the second pattern 165 is defined as a second capacitor electrode of the second storage capacitor StgC2 (of FIG. 4). The first bent portion 143 (of FIG. 4) of the first electrode 141 as the first capacitor electrode, the overlapped portion of the second pattern 165 as the second capacitor electrode, and the passivation layer 150 as a dielectric material layer constitute the second storage capacitor StgC2 (of FIG. 4). In addition, the plurality of fourth electrodes 168 extend from the second pattern 165 and are spaced apart from each other. The third electrodes 162 and the fourth electrodes 168 are alternately arranged with each other. The second pattern 165, the third electrodes 162 and the fourth electrodes 168 may be formed of the same material as the first pattern 160.

In the above array substrate according to the first embodiment of the present invention, the first electrode 141 is formed at the same layer and the same material as the first data line 133a. In addition, the first electrode 141 is disposed to be adjacent to the first data line 133a. Moreover, the second electrode 147 is formed at the same layer and the same material as the second data line 133b. The second electrode 147 is disposed to be adjacent to the second data line 133b. To prevent a shortage problem between the first data line 133a and the first electrode 141 and between the second data line 133b and the second electrode 147, the first and second electrodes 141 and 147 are spaced apart from the first and second data lines 133a and 133b, respectively, by the first distance d1. Although the array substrate in FIG. 4 has an improved aperture ration with compared to the related art array substrate, a limitation in an aperture ration still exists.

Figure 8:
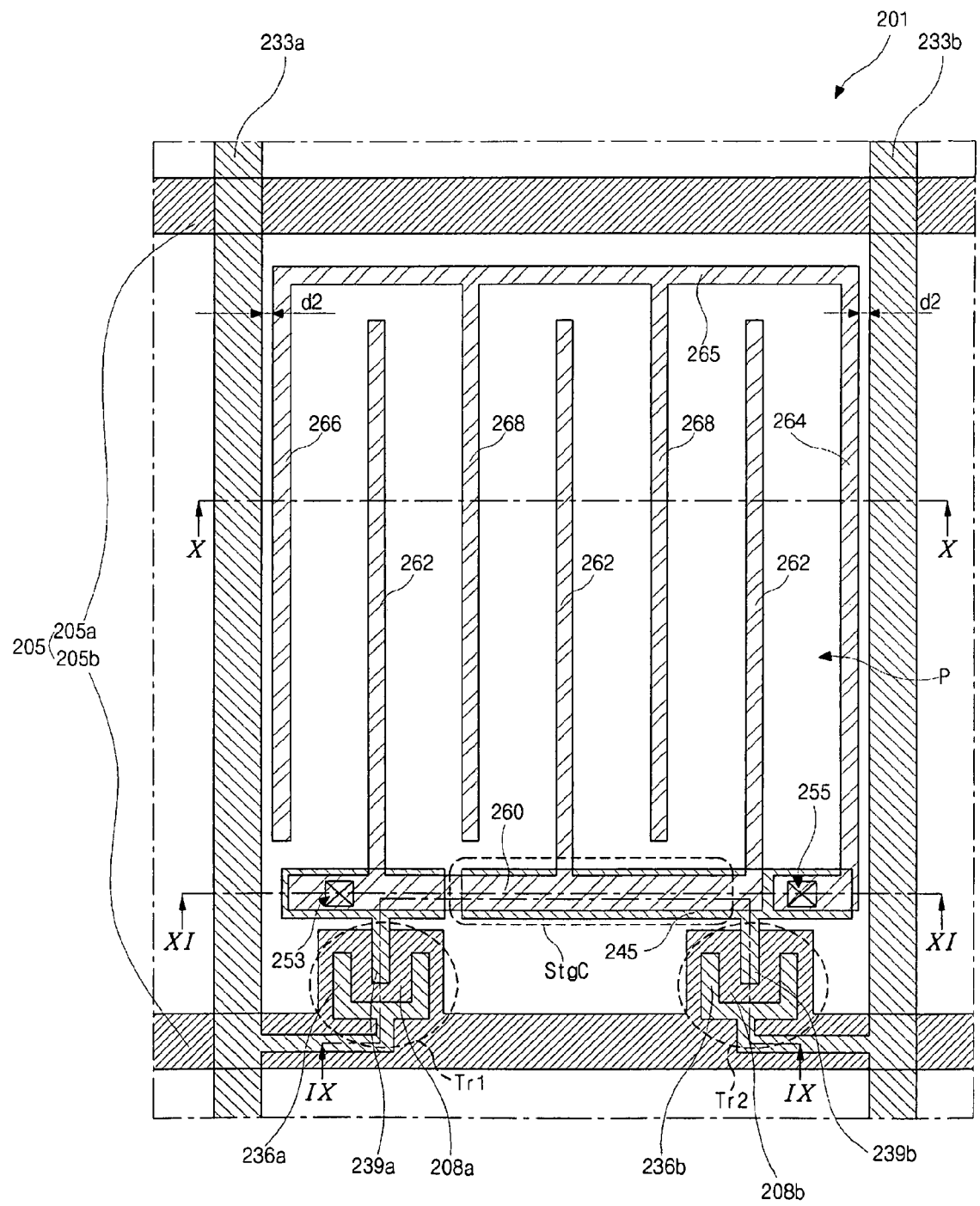
FIG. 8 is a schematic plane view showing one pixel region of an array substrate for an IPS mode LCD device according to a second embodiment of the present invention.

FIG. 8 is a schematic plane view showing one pixel region of an array substrate for an IPS mode LCD device according to a second embodiment of the present invention. The array substrate in FIG. 8 has a much improved aperture ratio.

In FIG. 8, the array substrate includes first and second gate lines 205a and 205b and first and second data lines 233a and 233b on a substrate 201. Each of the first and second data lines 233a and 233b crosses the first and second gate lines 205a and 205b to define pixel regions P.

First and second TFTs Tr1 and Tr2 are formed in each pixel region P. The first TFT Tr1 is disposed at a crossing portion of the second gate line 205b and the first data line 233a, while the second TFT Tr2 is disposed at a crossing portion of the second gate line 205b and the second data line 233b. The first TFT Tr1 is connected to the second gate line 205b and the first data line 233a, and the second TFT Tr2 is connected to the second gate line 205b and the second data line 233b. Although not shown, there are also two TFTs in an upper pixel region of the pixel region P in FIG. 8. One of the two TFTs in the upper pixel region is connected to the first gate line 205a and the first data line 233a, and the other of the two TFTs in the upper pixel region is connected to the first gate line 205a and the second data line 233b. Hereinafter, the first and second gate lines 205a and 205b are referred to a gate line 205.

The first TFT Tr1 includes a first gate electrode 208a, a gate insulating layer (not shown), a first semiconductor layer (not shown), which includes a first active layer (not shown) of intrinsic amorphous silicon and a first ohmic contact layer (not shown) of impurity-doped amorphous silicon, a first source electrode 236a and a first drain electrode 239a. The first semiconductor layer and the gate insulating layer are stacked on the first gate electrode 208a, and the first source electrode 236a and the first drain electrode 239a are formed on the first semiconductor layer. The first source electrode 236a is spaced apart from the first drain electrode 239a. The second TFT Tr2 includes a second gate electrode 208b, a gate insulating layer (not shown), a second semiconductor layer (not shown), which includes a second active layer (not shown) of intrinsic amorphous silicon and a second ohmic contact layer (not shown) of impurity-doped amorphous silicon, a second source electrode 236b and a second drain electrode 239b. The second semiconductor layer and the gate insulating layer are stacked on the second gate electrode 208b, and the second source electrode 236b and the second drain electrode 239b are formed on the second semiconductor layer. The second source electrode 236b is spaced apart from the second drain electrode 239b.

The first gate electrode 208a and the second gate electrode 208b are connected to the gate line 205, and the first source electrode 236a and the second source electrode 236b are connected to the first and second data lines 233a and 233b, respectively. The second drain electrode 239b of the second TFT Tr2 extends along a direction of the gate line 205 such that a drain extending portion 245 is formed.

In the pixel region P, a first pattern 260 is formed to be substantially parallel to the gate line 205. The first pattern 260 overlaps the drain extending portion 245 to form a storage capacitor StgC. The first pattern 260 contacts the first drain electrode 239a of the first TFT Tr1 through a first contact hole 253. A plurality of first electrodes 262 extend from the first pattern 260 and are spaced apart from each other.

In the pixel region P, a second electrode 264 is formed to be parallel and adjacent to the second data line 233b. One end of the second electrode 264 contacts the drain extending portion 245 through the second contact hole 255. The other end of the second electrode 264 is bent to form a second pattern 265 being parallel to and facing the first pattern 260. In addition, the second pattern 265 is bent to form a third electrode 266 being parallel and adjacent to the first data line 233a. A plurality of fourth electrodes 268 extend from the second pattern 265 and are spaced apart from each other. The first electrodes 262 and the fourth electrodes 268 are alternately arranged with each other and disposed between the first and second patterns 260 and 265 and between the second and third electrodes 264 and 266. Although the second and third electrodes 264 and 266 are connected to the second TFT Tr2 in FIG. 8, they can be connected to the first TFT Tr1 not the second TFT Tr2. In this case, the first pattern 260 is connected to the second TFT Tr2.

The array substrate according to the second embodiment of the present invention has one storage capacitor StgC. Accordingly, the second and third electrodes 264 and 266 can be formed on a layer different from the first and second data lines 233a and 233b. In addition, the second and third electrodes 264 and 266, which are adjacent to the second and first data lines 233b and 233a, respectively, are connected to one of the first and second TFTs Tr1 and Tr2. Since there is no shortage problem between the first data line 233a and the third electrode 266 and between the second data line 233b and the second electrode 264, the second and third electrodes 266 can be positioned to be closer to the first and second data lines 233a and 233b, respectively, than those of the array substrate in FIG. 4. Namely, a second distance d2 between the first data line 233a and the third electrode 266 and between the second data line 233b and the second electrode 264 is smaller than the first distance d1 (of FIG. 4). The second distance d2 may be smaller than about 5 micrometers. Accordingly, an aperture ratio of the array substrate is further improved.

Figure 9:
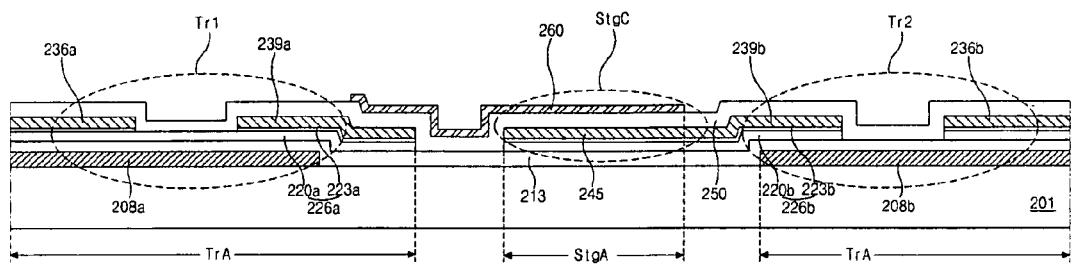
FIG. 9 is a cross-sectional view taken along the line IX-IX of FIG. 8.
Figure 10:
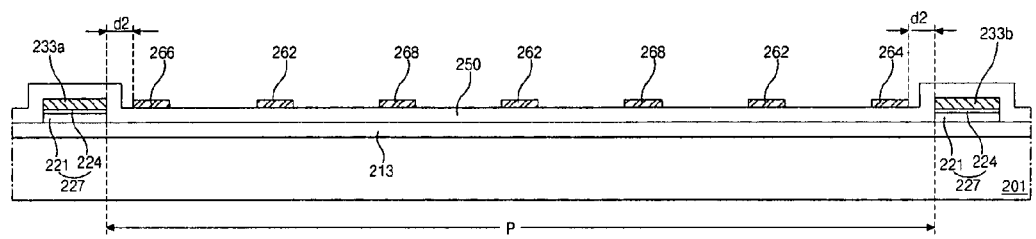
FIG. 10 is a cross-sectional view taken along the line X-X of FIG. 8.
Figure 11:
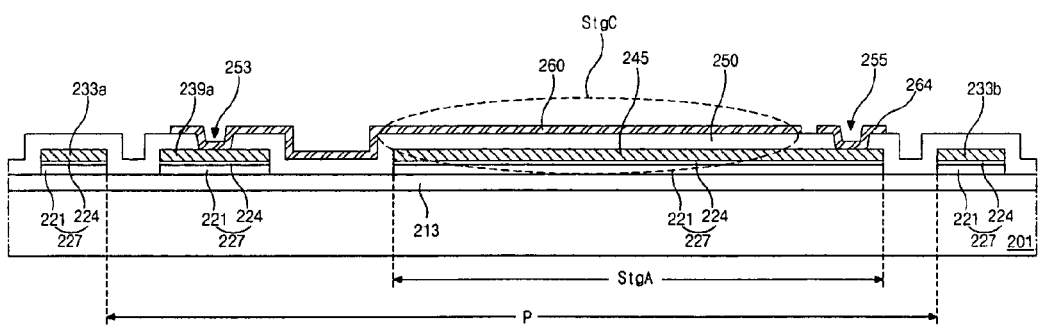
FIG. 11 is a cross-sectional view taken along the line XI-XI of FIG. 8.

With reference to FIGS. 9 to 11, a cross-sectional structure of the array substrate according to the second embodiment of the present invention in FIG. 8 is explained. FIG. 9 is a cross-sectional view taken along the line IX-IX of FIG. 8, FIG. 10 is a cross-sectional view taken along the line X-X of FIG. 8, and FIG. 11 is a cross-sectional view taken along the line XI-XI of FIG. 8. A switching region TrA, where the first and second TFTs are formed, and a storage region StgA, where the first storage capacitor is formed, are defined in the pixel region.

In FIGS. 9 to 11, the gate line 205 (of FIG. 8) of a first metallic material is formed on the substrate 201. The first and second gate electrodes 208a and 208b connected to the gate line are formed on the substrate 201 in the switching region TrA. The first and second gate electrodes 208a and 208b are formed of the same material as the gate line.

A gate insulating layer 213 of an inorganic insulating material is formed on the gate line and the first and second gate electrodes 208a and 208b. The first and second data lines 233a and 233b of a second metallic material are formed on the gate insulating layer 213. The first and second data lines 233a and 233b cross the gate line to define the pixel region P. In the switching region TrA, a first semiconductor layer 226a including a first active layer 220a and a first ohmic contact layer 223a and a second semiconductor layer 226b including a second active layer 220b and a second ohmic contact layer 223b are formed on the gate insulating layer 213. The first semiconductor layer 226a and the second semiconductor layer 226b correspond to the first and second gate electrodes 208a and 208b, respectively. The first source electrode 236a and the first drain electrode 239a, which are spaced apart from each other, are formed on the first semiconductor layer 226a, and the second source electrode 236b and the second drain electrode 239b, which are spaced apart from each other, are formed on the second semiconductor layer 226b. The first source electrode 236a is connected to the first data line 233a, and the second source electrode 236b is connected to the second data line 233b. Each of the first source electrode 236a, the first drain electrode 239a, the second source electrode 236b and the second drain electrode 239b may be formed of the same material as the first and second data lines 233a and 233b. The first gate electrode 208a, the gate insulating layer 213, the first semiconductor layer 226a, the first source electrode 236a and the first drain electrode 239a constitute the first TFT Tr1. The second gate electrode 208b, the gate insulating layer 213, the second semiconductor layer 226b, the second source electrode 236b and the second drain electrode 239b constitute the second TFT Tr2. The second drain electrode 239b extends into the switching region StgA to form the drain extending portion 245 being substantially parallel to the gate line. The drain extending portion 245 is defined as a first capacitor electrode of the storage capacitor.

A semiconductor pattern 227 having a double-layered structure of a first semiconductor pattern 224 and a second semiconductor pattern 221 is formed under each of the first and second data lines 233a and 233b. The first and second semiconductor patterns 224 and 221 are formed of the same material as the ohmic contact layers 223a and 223b and the active layers 220a and 220b, respectively. Whether the semiconductor pattern 227 is disposed under each of the first and second data lines 233a and 233b depends on a fabricating method of the array substrate. The semiconductor pattern may be omitted by another fabricating process.

A passivation layer 250 is formed on the first and second data lines 133a and 133b, and the first and second TFTs Tr1 and Tr2. The passivation layer 250 has the first and second contact holes 253 and 255 respectively exposing a portion of the first drain electrode 239a and a portion of the second drain electrode 239b, specially the drain extending portion 245. The passivation layer 250 may be formed of one of an inorganic insulating material and an organic insulating material.

The first pattern 260 of a third metallic material is formed on the passivation layer 250. The first pattern 260 contacts the first drain electrode 239a through the first contact hole 253 and overlaps the drain extending portion 245. An overlapped portion of the first pattern 260 is defined as a second capacitor electrode of the storage capacitor StgC. The plurality of first electrodes 262 extend from the first pattern 260 and are spaced apart from each other. In addition, the second electrode 264 is formed of the same material and the same layer as the first electrodes 262. One end of the second electrode 264 contacts the second drain electrode 239, specially the drain extending portion 245. The second electrode 264 is substantially parallel and adjacent to the second data line 223b. The other end of the second electrode 264 is bent to form the second pattern 265 being parallel to and facing the first pattern 260. In addition, the second pattern 265 is bent to form the third electrode 266 being parallel and adjacent to the first data line 233a. A plurality of fourth electrodes 268 extend from the second pattern 265 and are spaced apart from each other. The first electrodes 262 and the fourth electrodes 268 are alternately arranged with each other and disposed between the first and second patterns 260 and 265 and between the second and third electrodes 264 and 266.

In the above array substrate, each of the first and second data lines 233a and 233b is formed on the gate insulating layer 213, while each of the second and third electrodes 264 and 266, which are adjacent to the second and first data lines 233a and 233b, respectively, is formed on the passivation layer 250. Since there is no shortage problem between the first data line 233a and the third electrode 266 and between the second data line 233b and the second electrode 264, the second and third electrodes 266 can be positioned to be closer to the first and second data lines 233a and 233b, respectively. The third electrode 266 and the second electrode 264 are spaced apart from the first and second data lines 233a and 233b, respectively, by a second distance d2 with a range smaller than about 5 micrometers. Accordingly, an aperture ratio of the array substrate is further improved.

Figure 12:
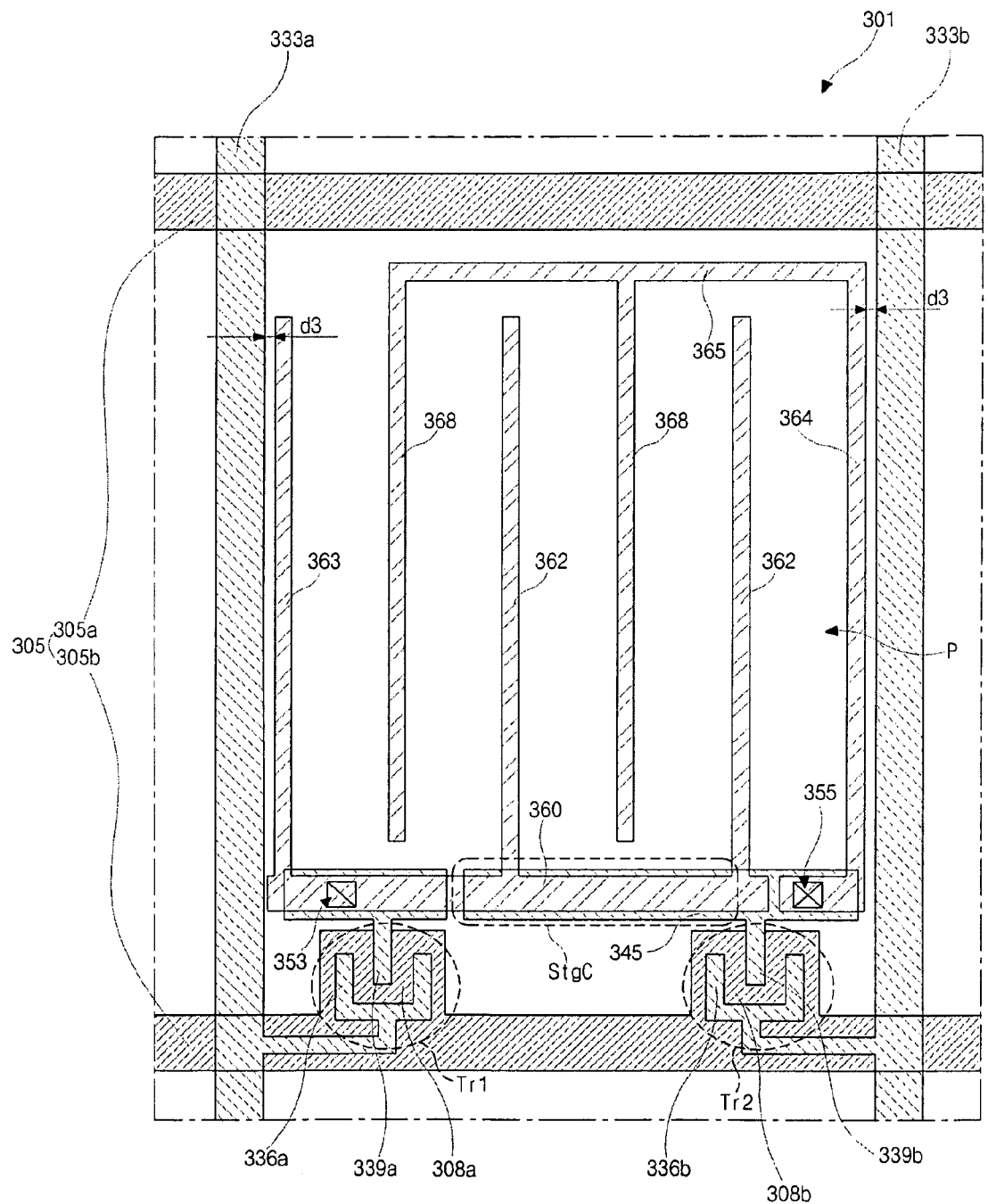
FIG. 12 is a schematic plane view showing one pixel region of an array substrate for an IPS mode LCD device according to a third embodiment of the present invention.

FIG. 12 is a schematic plane view showing one pixel region of an array substrate for an IPS mode LCD device according to a third embodiment of the present invention. Explanation of elements having the same structure as those in FIG. 8 is omitted.

Being different from the array substrate in FIG. 8, an electrode adjacent to a first data line is not connected to an electrode adjacent to a second data line in FIG. 12. Referring to FIG. 12, a plurality of first electrodes 362 and a third electrode 363, which is substantially parallel and adjacent to a first data line 333a, are connected to a first pattern 360. Since the first pattern 360 extends from a first drain electrode 339a of a first TFT Tr1, which is connected to the first data line 333a, the first electrodes 362 and the third electrode 363 are connected to the first TFT Tr1. The third electrode 363 is formed on a layer different from the first data line 333a. In addition, a second electrode 364, which is substantially parallel and adjacent to a second data line 333b, is connected to a second TFT Tr2, and a plurality of fourth electrodes 368 are connected to the second TFT Tr2 through the second electrode 364. The third electrode 363 and the second electrode 364 are spaced apart from the first and second data lines 333a and 333b, respectively, by a third distance d3 with a range smaller than about 5 micrometers. Since a number of the first and third electrodes 362 and 363 are same as that of the second and fourth electrodes 364 and 368, an aperture ratio is further improved.

With reference to FIGS. 8 to 11, a fabricating process of an array substrate for an IPS mode LCD device according to the second embodiment of the present invention is explained.

First, a first metallic material is deposited on an entire surface of the substrate 201 to form a first metal layer (not shown). A mask process, which includes a step of coating a photoresist (PR) layer, a step of exposing the PR layer, a step of developing the exposed PR layer, a step of etching the corresponding metal layer and stripping remained PR patterns, is performed to pattern the first metal layer (not shown). As a result, the gate line 205 and the first and second gate electrodes 208a and 208b, which are connected to the gate line 205, are formed on the substrate 201.

Next, the gate insulating layer 213 is formed on the gate line 205 and the first and second gate electrodes 208a and 208b by depositing an inorganic insulating material such as silicon oxide (SiO$_2$) and silicon nitride (SiNx).

Next, an intrinsic amorphous silicon layer (not shown), an impurity-doped amorphous silicon layer (not shown) and a second metallic material layer (not shown) are sequentially formed on the gate insulating layer 213. Then, the intrinsic amorphous silicon layer (not shown), the impurity-doped amorphous silicon layer (not shown) and the second metallic material layer (not shown) are patterned by a single mask process using a refractive exposure mask or a half-tone mask or two mask process to form the first and second active layers 220a and 220b of intrinsic amorphous silicon, the first and second ohmic contact layers 223a and 223b of impurity-doped amorphous silicon, the first and second source electrodes 236a and 236b, and the first and second drain electrodes 239a and 239b. The first and second active layers 220a and 220b corresponds to the first and second gate electrodes 208a and 208b, respectively. The first and second ohmic contact layers 223a and 223b are disposed on the first and second active layers 220a and 220b, respectively, and expose a portion of the first ohmic contact layer 223a and a portion of the second ohmic contact layer 223b, respectively. The first source electrode 236a and the first drain electrode 239a are disposed on the first ohmic contact layer 223a and spaced apart from each other. The second source electrode 236b and the second drain electrode 239b are disposed on the second ohmic contact layer 223b and spaced apart from each other. At the same time, the first and second data lines 233a and 233b are formed on or over the gate insulating layer 213. Each of the first and second data lines 233a and 233b crosses the gate line 205 to define the pixel region P. The first and second source electrodes 236a and 236b are connected to the first and second data lines 233a and 233b, respectively. The second drain electrode 239b extends into the switching region StgA to form the drain extending portion 245 being substantially parallel to the gate line 205. The drain extending portion 245 functions as a first electrode of the storage capacitor StgC.

When the first and second active layers 220a and 220b, the first and second ohmic contact layers 223a and 223b, the first and second data lines 233a and 233b, the first and second source electrodes 236a and 236b, and the first and second drain electrodes 239a and 239b are formed by a single mask process, the semiconductor pattern 227 having a double-layered structure of a first semiconductor pattern 224 and a second semiconductor pattern 221 is formed under each of the first and second data lines 233a and 233b, as shown in FIGS. 6 and 7.

However, when the first and second active layers 220a and 220b, the first and second ohmic contact layers 223a and 223b, the first and second data lines 233a and 233b, the first and second source electrodes 236a and 236b, and the first and second drain electrodes 239a and 239b are formed by different mask processes, there is no the semiconductor pattern 227 under each of the first and second data lines 233a and 233b. In this case, each of the first and second active layers and the first and second ohmic contact layers has an island shape.

The first gate electrode 208a, the gate insulating layer 213, the first semiconductor layer 226a, the first source electrode 236a and the first drain electrode 239a constitute the first TFT Tr1. The second gate electrode 208b, the gate insulating layer 213, the second semiconductor layer 226b, the second source electrode 236b and the second drain electrode 239b constitute the second TFT Tr2.

Next, the passivation layer 250 is formed on the first and second data lines 133a and 133b, and the first and second TFTs Tr1 and Tr2 by depositing an inorganic insulating material such as silicon oxide (SiO$_2$) and silicon nitride (SiNx). The passivation layer 250 is patterned by a mask process to form the first and second contact holes 253 and 255 respectively exposing a portion of the first drain electrode 239a and a portion of the second drain electrode 239b, specially the drain extending portion 245.

Next, a transparent conductive material layer (not shown) is formed on the passivation layer 250 by depositing a transparent conductive material such as indium-tin-oxide (ITO) and indium-zinc-oxide (IZO). The transparent conductive material layer is patterned by a mask process to form the first pattern 260 and the first electrodes 262. The first pattern 260 contacts the first drain electrode 239a through the first contact hole 253 and extends into the storage region to overlaps the drain extending portion 245. An overlapped portion of the first pattern 260 functions as a second capacitor electrode of the storage capacitor StgC. The first electrodes 262 extend from the first pattern 260 and are spaced apart from each other. At the same time, the second electrode 264, the second pattern 265, the third electrode 266 and the fourth electrodes 268 are formed on the passivation layer 250. The second electrode 264 is substantially parallel and adjacent to the second data line 233b. One end of the second electrode 264 contacts the second drain electrode 239b through the second contact hole 255, and the other end of the second electrode 264 is bent to form the second pattern 265 being parallel to and facing the first pattern 260. The second pattern 265 is bent to form the third electrode 266 being parallel and adjacent to the first data line 233a. The fourth electrodes 268 extend from the second pattern 265 and are spaced apart from each other. The first electrodes 262 and the fourth electrodes 268 are alternately arranged with each other and disposed between the first and second patterns 260 and 265 and between the second and third electrodes 264 and 266.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An array substrate for an in-plane switching mode liquid crystal display device, comprising:
   a gate line on a substrate;
   a gate insulating layer on the gate line;
   first and second data lines on the gate insulating layer and crossing the gate line to define a pixel region;
   a first thin film transistor (TFT) in the pixel region and connected to the gate line and the first data line;
   a second TFT in the pixel region and connected to the gate line and the second data line;
   a passivation layer on the first and second data lines and the first and second TFTs;
   a first pattern connected to the first TFT and extending along the gate line;
   a plurality of first electrodes connected to the first pattern and spaced apart from each other, the plurality of first electrodes parallel to the first and second data lines;
   a second pattern extending to be parallel to the first pattern;
   a second electrode extending along the first data line and spaced apart from the first data line by a first distance;
   a third electrode connected to the second pattern and extending along the second data line, the third electrode connected to the second TFT and spaced apart from the second data line by a second distance; and
   a plurality of fourth electrodes connected to the second pattern and alternately arranged with the plurality of first electrodes,
   wherein the plurality of first electrodes and the plurality of fourth electrodes are disposed between the second and third electrodes,
   wherein a portion of the second TFT extends to overlap the first pattern.

2. The array substrate according to claim 1, wherein each of the first and second TFTs includes a gate electrode on the substrate, a semiconductor layer on the gate insulating layer and source and drain electrodes on the semiconductor layer.

3. The array substrate according to claim 2, wherein the gate electrodes of the first and second TFTs are connected to the gate line, and wherein the source electrode of the first TFT is connected to the first data line, and the source electrode of the second TFT is connected to the second data line.

4. The array substrate according to claim 2, wherein the portion of the second TFT is the drain electrode of the second TFT, and the passivation layer of an insulating material is disposed between the drain electrode and the first pattern.

5. The array substrate according to claim 2, wherein the passivation layer includes a first contact hole exposing the drain electrode of the first TFT and a second contact hole exposing the drain electrode of the second TFT, and wherein the first pattern and the third electrode contact the drain electrode of the first TFT and the drain electrode of the second TFT through the first and second contact hole, respectively.

6. The array substrate according to claim 1, wherein the first and second patterns, the plurality of first electrodes, the second electrode, the third electrode and the plurality of fourth electrodes are formed on the passivation layer and of the same material as each other.

7. The array substrate according to claim 1, wherein each of the first and second distances is smaller than about 5 micrometers.

8. The array substrate according to claim 1, wherein a first signal voltage greater than a reference voltage is applied to the first data line, and a second signal voltage smaller than the reference voltage is applied to the second data line.

9. The array substrate according to claim 1, wherein the second electrode is connected to the first pattern.

10. The array substrate according to claim 1, wherein the second electrode is connected to the second pattern.

11. The array substrate according to claim 1, wherein the plurality of first electrodes and the plurality of fourth electrodes are disposed between the first and second patterns.

* * * * *